(12) United States Patent
Lee et al.

(10) Patent No.: US 6,377,529 B1
(45) Date of Patent: Apr. 23, 2002

(54) METHOD FOR PROVIDING IMPROVED EQUALIZATION FOR THE READING OF MARKS ON OPTICAL DATA-STORAGE MEDIA

(75) Inventors: David C. Lee, Guangdong (CN); Yi Ling, Foster City; Yung-Cheng Lo, San Leandro, both of CA (US); Steve W. McLaughlin, Decatur, GA (US)

(73) Assignee: Calimetrics, Inc., Alameda, CA (US)

( * ) Notice: Subject to any disclaimer, the term of this patent is extended or adjusted under 35 U.S.C. 154(b) by 0 days.

(21) Appl. No.: 09/588,101

(22) Filed: Jun. 1, 2000

(51) Int. Cl.$^7$ .................................................. G11B 3/90
(52) U.S. Cl. ................ 369/59.1; 369/53.33; 369/59.22; 375/232
(58) Field of Search .............................. 369/59.1, 59.22, 369/53.33, 59.24, 59.96, 32, 47.17; 714/794, 795; 360/46; 375/341, 232, 262, 233

(56) References Cited

U.S. PATENT DOCUMENTS

| | | | | |
|---|---|---|---|---|
| 4,615,038 A | * | 9/1986 | Lim et al. ...................... | 375/232 |
| 4,905,254 A | * | 2/1990 | Bergmans .................... | 375/233 |
| 5,537,382 A | * | 7/1996 | McLaughlin et al. ..... | 369/59.24 |
| 5,561,687 A | * | 10/1996 | Turner ........................ | 375/233 |
| 5,563,864 A | * | 10/1996 | Kobayashi et al. ....... | 369/59.22 |
| 5,572,503 A | * | 11/1996 | Satoh et al. .............. | 369/47.17 |
| 5,586,100 A | * | 12/1996 | Lee et al. ................. | 369/53.33 |
| 5,606,464 A | * | 2/1997 | Agazzi et al. ................ | 360/46 |
| 5,784,415 A | * | 7/1998 | Chevillat et al. ........... | 375/341 |
| 5,818,806 A | * | 10/1998 | Wong et al. ............. | 369/53.33 |
| 5,995,561 A | * | 11/1999 | Yamasaki et al. ........... | 375/341 |
| 6,012,161 A | * | 1/2000 | Ariyavisitakul et al. .... | 714/795 |
| 6,104,766 A | * | 8/2000 | Coker et al. ................. | 714/794 |

OTHER PUBLICATIONS

Bouwhuis, Braat, A Huijser, Pasman, van Rosmalen, and Immink, "Principles of Optical Disc Systems", Chapter 2, Adam Hilger, LTD., Boston Mass. 1985.

* cited by examiner

Primary Examiner—David Hudspeth
Assistant Examiner—Kim-Kwok Chu
(74) Attorney, Agent, or Firm—Van Pelt & Yi LLP

(57) ABSTRACT

A method is disclosed for compensating for intersymbol interference on an optical disc. The method includes measuring an intersymbol linear transfer function. The intersymbol linear transfer function substantially describes a linear portion of the effect of intersymbol interference on an optically detected read signal from an optical disc. A partial response target frequency response is divided by the intersymbol linear transfer function to obtain a linear equalization filter response. A read signal from the optical disc is convolved with the linear equalization filter response. This results in the read signal being equalized and containing a controlled partial-response target intersymbol interference. There is also disclosed a method of compensating utilizing a decision feedback equalizer where the target frequency response is either a partial-response or a zero-forcing response.

28 Claims, 13 Drawing Sheets

METHOD FOR PROVIDING IMPROVED EQUALIZATION FOR THE READING OF MARKS ON OPTICAL DATA-STORAGE MEDIA

CROSS REFERENCE TO RELATED APPLICATIONS

This application is related to U.S. Pat. No. 5,818,806 entitled "Method And Apparatus For Providing Equalization For The Reading of Marks On Optical Data Storage Media" filed May 6, 1997, which is incorporated herein by reference for all purposes.

BACKGROUND OF THE INVENTION

1. Field of the Invention

The present invention relates generally to a method for providing improved equalization for the reading of marks on optical data-storage media. More specifically, the invention relates to a method for digital signal processing a read signal to compensate for intersymbol interference among the marks.

2. Description of the Related Art

In order to increase the capacity and speed of optical data-storage systems, multilevel optical recording systems have been developed. Note that in this specification, the term multilevel refers to more than two levels. In a traditional optical recording system, reflectivity of the recording medium is modulated between two states. The density of data recorded on an optical recording medium can be increased by modulating the reflectivity of the optical recording medium into more than two states.

However, at high data densities, light reflected from one mark will tend to interfere with light reflected from adjacent marks, causing intersymbol interference (ISI). The effect of the ISI is greater when the marks are closer together. A "modulation transfer function" (MTF) describes the transformation of the detected read signal that results from interference from neighboring marks.

Optical data disc readers currently use analog filtering of the read signal to equalize the frequency response of the system. The equalization is an attempt to compensate for the MTF, which predicts how much contrast an optical imaging system will generate when scanning different spatial frequencies. Current art uses a simple frequency equalization as discussed in *Principles of Optical Disc Systems*, Bouwhuis, Braat, Huijser, Pasman, van Rosmalen, and Immink, 1985, Adam Hilger Ltd., Boston, Mass., chapter 2, which is herein incorporated by reference for all purposes.

Generally, the MTF does not have a flat frequency response; the magnitude of the MTF decreases monotonically with increasing spatial frequency, reaching zero at a limit called the optical cutoff frequency. For example, the peak-to-peak signal from a series of 0.83 $\mu$m marks on a CD is approximately 40% that from 1.6 $\mu$m marks. Above the cutoff frequency, which for a CD corresponds to 0.43 $\mu$m marks, a CD reader would detect no contrast at all. Since the shorter marks correspond to higher temporal frequencies in the detector signal, one can "equalize" the contrasts of long and short marks by increasing the high-frequency gain in the reader electronics.

Digital equalization is superior to analog equalization, for various reasons as discussed in U.S. Pat. No. 5,818,806 (the '806 patent). FIG. 1 is a block diagram which illustrates the multilevel optical data-storage and data recovery system using digital equalization described in the '806 patent. A data signal 102 includes a sequence of multilevel symbols $x_i$ received from the modulation encoder. The value of each $x_i$ is one of M possible levels. Data signal 102 is fed to a precompensator 104 which precompensates the signal to help remove nonlinear ISI effects and possibly some linear ISI effects. The precompensated signal 106 is sent to an optical disc writing system 108, which writes to an optical disc 110. An optical disc reading system 112 then reads the disc. An analog-to-digital converter (ADC) 114 samples the optical read signal once per multilevel symbol. The sampled read signal 116 enters the digital equalizer 118, which inverts the uncompensated portion of the channel MTF, yielding recovered levels $y_i$ 120 that are identical to corresponding written levels $x_i$ plus some random noise component. Such an equalizer is called a zero-forcing (ZF) equalizer because, by inverting the channel MTF, it forces the ISI to zero.

A real system contains significant laser, media, and electronic noise that can result in errors in subsequent detection or decoding blocks. A ZF equalizer, by inverting the channel, boosts high frequencies of both signal and noise, thus enhancing the high-frequency noise components, which can lead to increased errors. Moreover, a filter with high-frequency gain has a relatively long time-domain response that requires many filter taps to implement, which leads to a high computational load. Also, in practical systems timing offsets in the ADC can significantly degrade the performance of baud-spaced equalizers.

In view of the foregoing, there is a need for methods for providing better equalization filters than those that are currently available. Specifically, it would be desirable if equalization filters could be developed which do not cause excessive noise enhancement during equalization and which have better immunity to fixed timing offsets in sampling.

SUMMARY OF THE INVENTION

Accordingly, a method is disclosed for providing improved digital equalization filters for multilevel data-storage that do not enhance high-frequency noise components, as well as filter structures that have superior performance to baud-spaced equalization filters, especially in the presence of timing offsets.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a method of compensating for intersymbol interference in an optical data storage channel is shown. The method includes measuring an intersymbol linear modulation transfer function. Data is written to the optical data storage channel. A partial response target frequency response is divided by the intersymbol linear modulation transfer function for obtaining a linear equalization filter response. A read signal is obtained from the optical data storage channel. The read signal is convolved with the linear equalization filter response to produce an equalized read signal containing a controlled partial-response target intersymbol interference.

In another embodiment, a method of compensating for intersymbol interference in an optical data storage channel is described. The method includes reading a read signal from the optical data storage channel and equalizing the read signal to achieve a desired target response. The equalizing includes forward filtering the read signal to remove precursor intersymbol interference. The forward filtering produces a forward filtering output for slicing to produce tentative decisions. Reverse filtering the tentative decisions produces predicted postcursor intersymbol interference. Subtracting the predicted postcursor intersymbol interference from the forward filtering output thereby produces an equalized read signal.

In another embodiment, a method of compensating for intersymbol interference in an optical data storage channel is shown. The method comprises measuring an intersymbol modulation transfer function, determining a desired target response from the modulation transfer fiction, writing data to the optical data storage channel, reading a read signal from the optical data storage channel, and equalizing the read signal to achieve the desired target response. The equalizing includes forward filtering the read signal for removing precursor intersymbol interference, the forward filtering producing a forward filtering output, slicing the forward filtering output to produce tentative decisions, reverse filtering the tentative decisions to produce predicted postcursor intersymbol interference, and subtracting the predicted postcursor intersymbol interference from the forward filtering output thereby producing an equalized read signal.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail in order not to unnecessarily obscure the present invention.

1. Partial-Response Equalization

Figure 1:
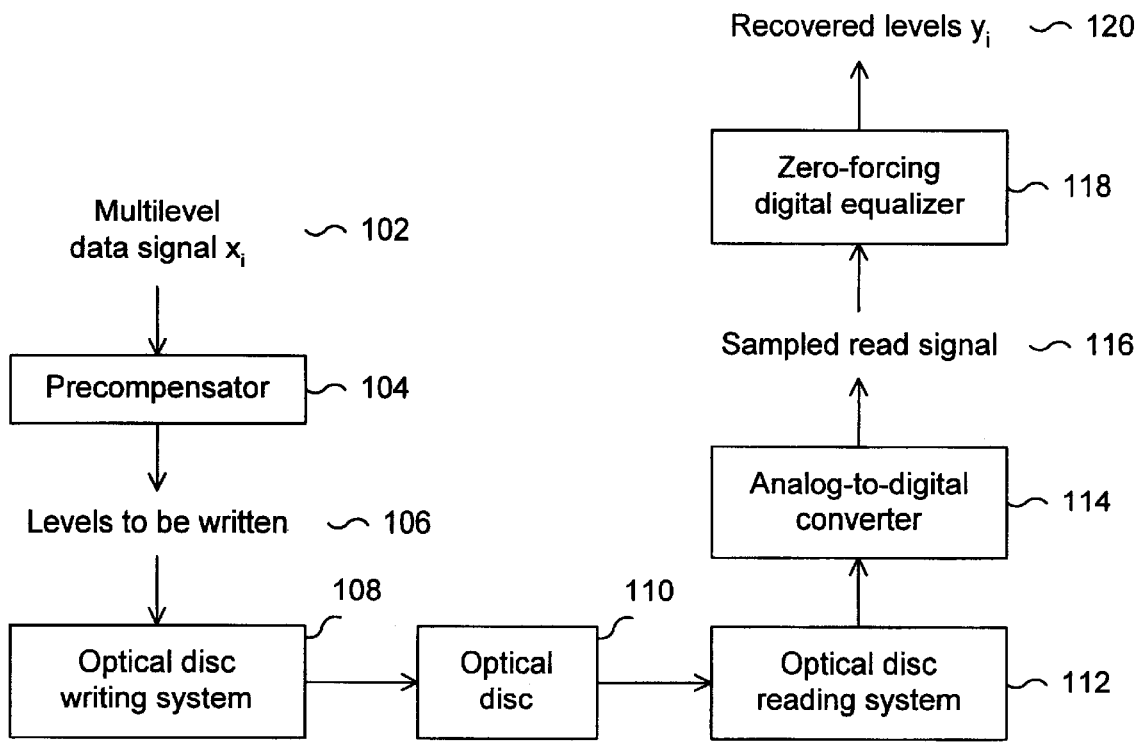
FIG. 1: Multilevel Optical Data-Storage System Using Zero-Forcing Digital Equalization (Prior Art)
Figure 2A:
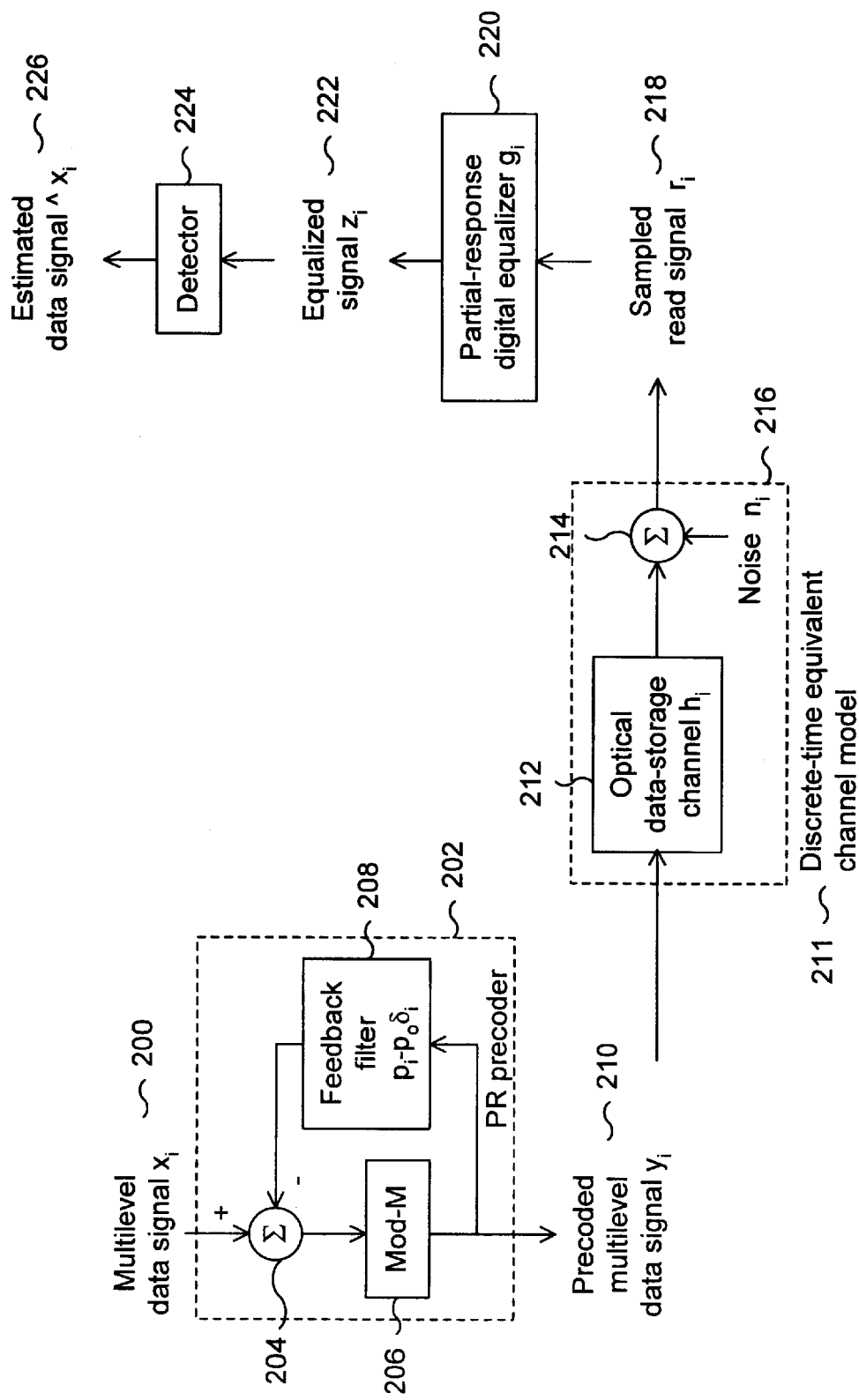
FIG. 2A: Multilevel Optical Data-Storage System Using Partial-Response Digital Equalization

FIG. 2A is a block diagram illustrating a preferred embodiment for compensating for ISI in a multilevel optical data-storage system to achieve a well-controlled partial-response (PR) target ISI. Although a multilevel system is shown, it can be appreciated that the invention also applies to a binary system. A multilevel data symbol sequence $x_i$ 200 enters an optional PR precoder 202 that subtracts future ISI of the PR target $p_i$ introduced by an optical channel 212 and an equalizer 220. The precoder 202 consists of an adder 204, modulus-M operator 206, and feedback filter $p_i - P_0 \delta_i$ 208, where $\delta_i$ is the kronecker delta. Its output $y_i$ 210 is written to an optical data-storage channel $h_i$ 212 representing the discrete-time equivalent combined response of precompensator, optical read and write systems (including MTF), analog read electronics, and ADC. An adder 214 models the effect of laser, media, and electronic noise by adding a noise component $n_i$ 216 to the channel output. The channel 212, adder 214, and noise 216 comprise the discrete-time equivalent channel model 211, shown as a dotted rectangle encompassing them. It models the physical optical channel as a linear, time-invariant system with additive noise. The sampled read signal $r_i$ 218 enters a digital equalization filter $g_i$ 220 whose output $z_i$ 222 is some linear combination, called the PR target $p_i$, of the precoded channel input sequence $y_i$ 210 plus an additive noise component. Finally a detector 224 produces an estimate $\hat{x}_i$ 226 of the input data $x_i$ 200.

The sampled read signal 218 is given by:

$$r_i = h_i * y_i + n_i,$$

where * represents the convolution operator.
The equalized signal 222 is given by:

$$z_i = g_i * r_i.$$

Figure 2B:
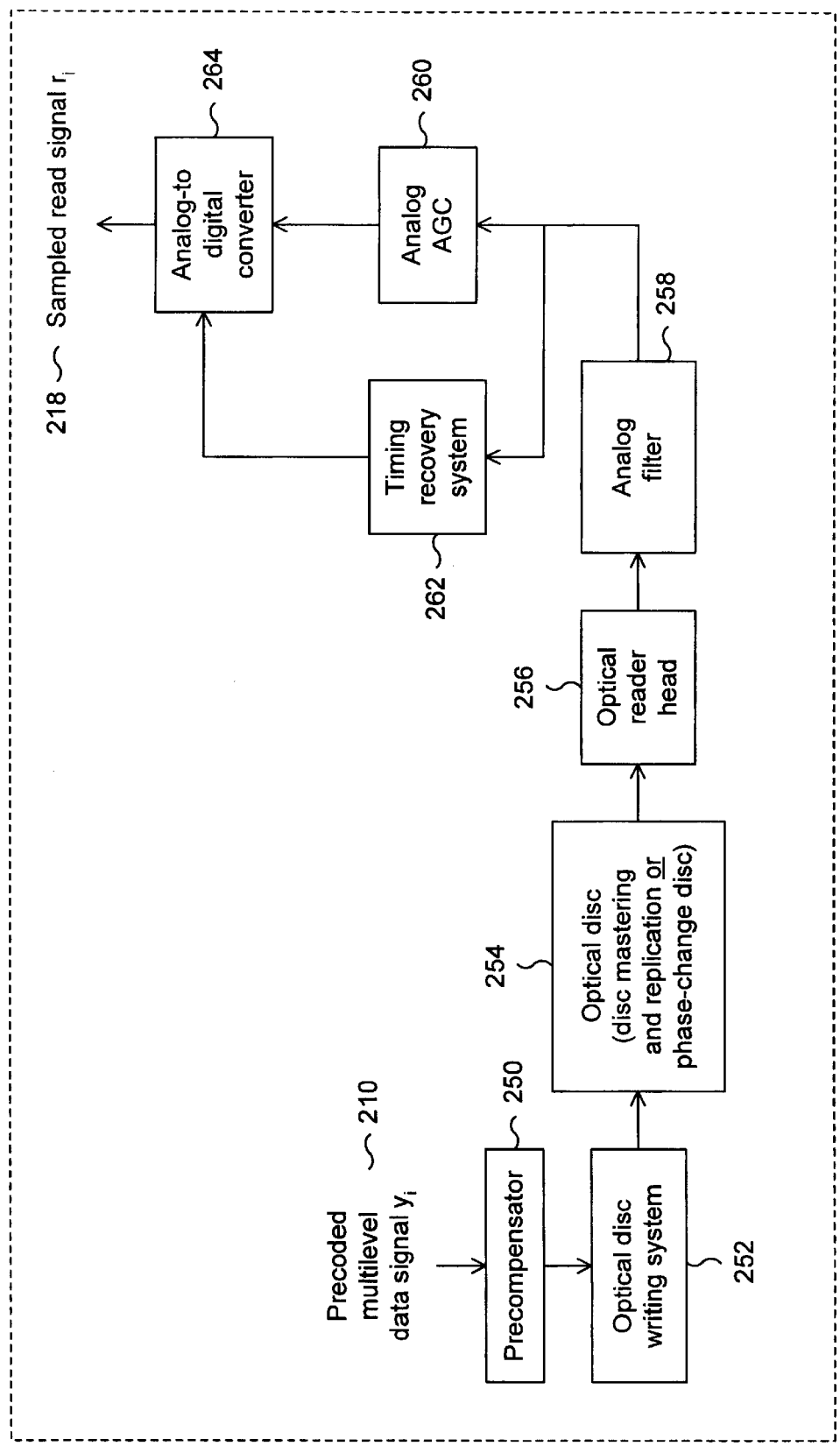
FIG. 2B: Optical Data-Storage Channel

FIG. 2B shows a block diagram of the discrete-time equivalent optical data-storage channel model 211 of FIG. 2A in greater detail. Multilevel data symbols $y_i$ 210 enter a precompensator 250 that contains a write strategy for translating the discrete-time multilevel symbol sequence into a continuous-time laser modulation signal. The precompensator 250, also called a write compensator, determines the starting and ending times and levels of laser pulses for writing each multilevel symbol, adjusting these parameters based on the preceding and following multilevel symbols so as to compensate for certain, primarily nonlinear, ISI effects that will occur during the writing and reading process as described in U.S. patent application Ser. No. 09/496,898 filed Feb. 2, 2000, entitled "Write Compensation for a Multi-Level Data Storage System" which is herein incorporated by reference, hereinafter Powelson et. al. The laser modulation signal is sent to an optical disc writing system 252, which writes marks onto an optical disc 254. In one embodiment, the optical disc undergoes a disc mastering and replication process as typically used in ROM data-storage systems. In another embodiment, this optical disc is made of phase-change or dye material as typically found in WORM (write once, read many) and RW (rewritable) data-storage systems. Further, it is anticipated that the optical disc is made of fluorescent or photopolymer materials. An optical reader head 256 reads the optical disc 254 (possibly a different disc physically if it is a ROM data-storage system, but still containing the same data), producing an analog read signal which enters an analog filter 258 to remove noise. In one embodiment, the analog filter 258 is a simple anti-aliasing low-pass filter. In another embodiment, the analog filter 258 is a matched filter. The filtered signal then enters an optional analog automatic gain controller (AGC) 260 as well as a timing-recovery system 262. The analog AGC 260, also called an analog desnaker, removes from the read signal amplitude modulation effects on the envelope of the read signal caused not by the recorded data but by variations in the characteristics of the optical disc or in the mechanics of the optical writing system and reader head as described in U.S. patent application Ser. No. 09/253,808 filed Feb. 18, 1999, entitled "Method and Apparatus for Reading and Writing a Multi-Level Signal from an Optical Disc" which is herein incorporated by reference, hereinafter Wong et. al. The timing-recovery system 262 contains a phase-locked loop (PLL) to recover the symbol clock, as described in Wong et. al., which controls an analog-digital converter (ADC) 264 that samples the desnaked read signal. The ADC output is the sampled read signal 218 of FIG. 2A.

The PR target $p_i$ is the optical channel response $h_i$ convolved with the equalization filter $g_i$; i.e., $$p_i = h_i * g_i,$$

where * represents the convolution operator. The PR target is usually chosen to have a finite number of integral taps $p_i$. Commonly used PR targets are:

PR1: $1+D$ ($p_0=p_1=1$, $p_i=0$, $i>1$)
PR2: $1+2D+D^2$ ($p_0=1$, $p_1=2$, $p_2=1$, $p_i=0$, $i>2$)
1111: $1+D+D^2+D^3$ ($p_0=p_1=p_2=p_3=1$, $p_i=0$, $i>3$)
1221: $1+2D+2D^2+D^3$ ($p_0=1$, $p_1=2$, $p_2=2$, $p_3=1$, $p_i=0$, $i>3$)

PR targets can be considered a generalization of the zero-forcing (ZF) target, where $p_0=1$, $p_i=0$, $i>0$, where the ZF equalization filter inverts the optical channel response. In practice, though, the ZF target is not referred to as a type of PR target because ZF equalization, or channel inversion, removes all ISI, whereas PR equalization allows ISI but shapes or controls the ISI to a desired target.

The optical channel response can be obtained by writing a known pattern to the optical channel. The pattern is then read from the channel and compared to the original pattern to obtain the MTF of the channel.

Using the z-Transform and inverse z-Transform, one can move from discrete-time domain to digital frequency domain and vice versa, respectively. In the digital frequency domain, the PR target frequency response P(z), optical channel frequency response H(z), and equalization filter response G(z) are related by:

$$P(z) = H(z)G(z),$$

where P(z), H(z), and G(z) are the z-Transform transfer functions of $p_i$, $h_i$, and $g_i$, respectively. Thus given a PR target and an optical channel response, one can calculate the taps $g_i$ of the equalization filter, if it exists, by inverting $G(z)=P(z)/H(z)$.

Figure 3:
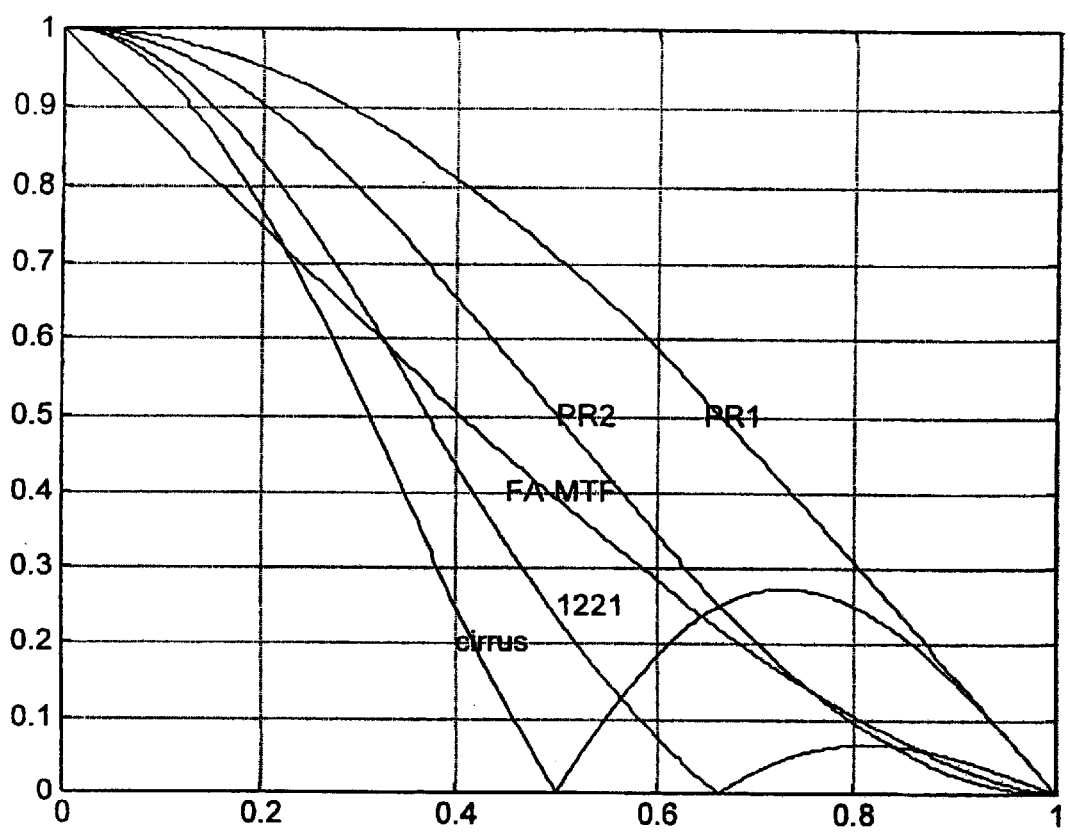
FIG. 3: Frequency Responses of Various Partial-Response Targets Compared With Full-Aperture Modulation Transfer Function

A PR target that closely matches the actual optical channel response will result in a short, simple equalization filter. Additionally, such an equalization filter will have low energy, resulting in little increase or enhancement of the channel noise, particularly at high frequencies. In fact, the PR targets listed above all have zeros in their frequency spectrums that may even match the optical channel cutoff frequency for an appropriate mark length. FIG. 3 illustrates this principle with the different PR targets plotted together with a theoretical channel response for the optical CD system called the full-aperture modulation transfer function as described in U.S. patent application Ser. No. 09/369,746 filed Aug. 6, 1999, entitled "Coding System and Method for Partial Response Channels" which is herein incorporated by reference, hereinafter McLaughlin et. al. Thus in certain circumstances PR equalization may have lower computational complexity and better performance than ZF equalization.

2. Decision-Feedback Equalization

Figure 4:
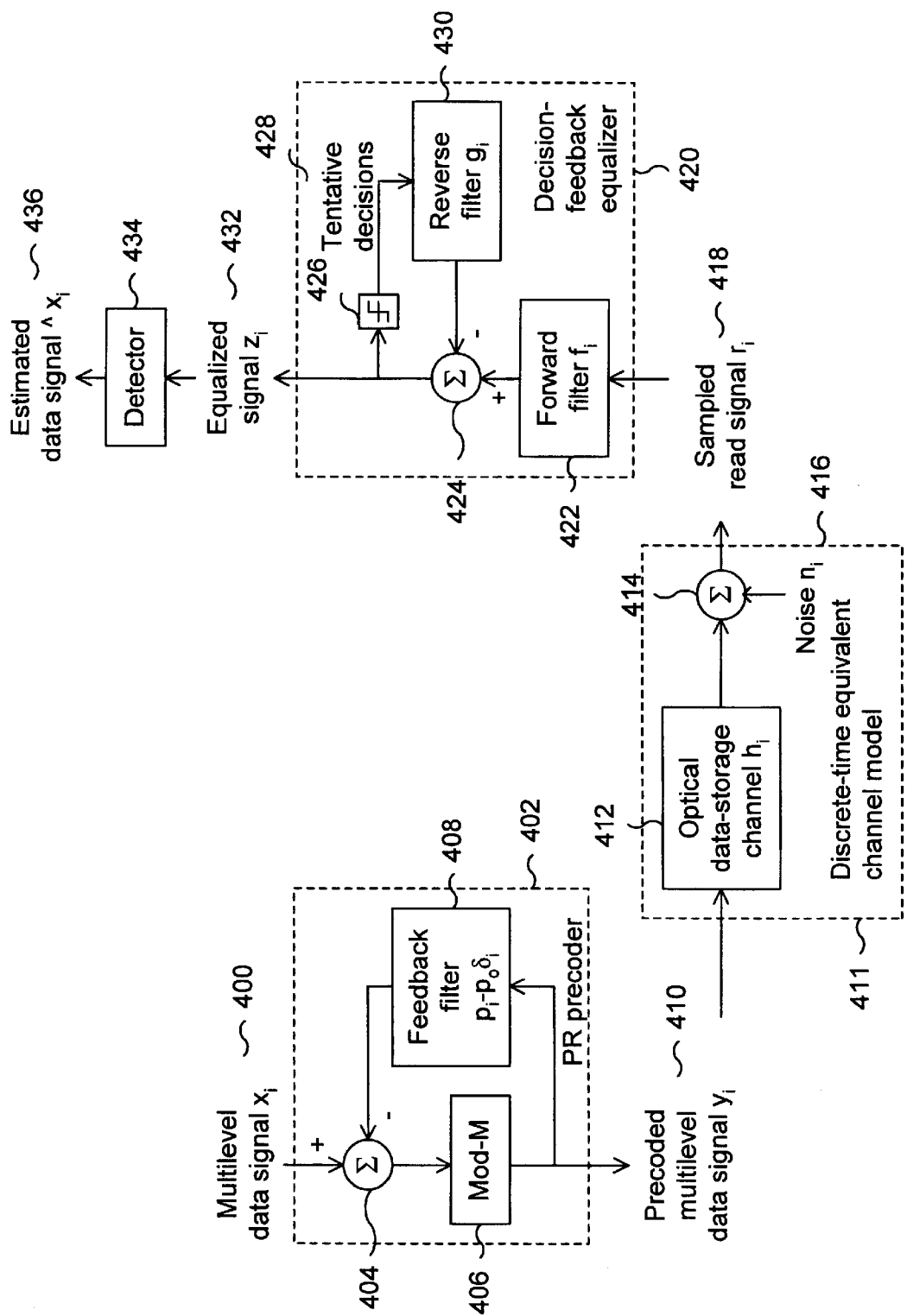
FIG. 4: Multilevel Optical Data-Storage System Decision-Feedback Equalization

In another embodiment, the optical data-storage system uses a decision-feedback equalizer (DFE) instead of a linear equalizer (LE) to achieve the desired ZF or PR target. FIG. 4 is a block diagram illustrating such a system. A multilevel data symbol sequence $x_i$ 400 enters an optional PR precoder 402 (no precoder for ZF case) that subtracts future ISI of the PR target $p_i$ introduced by an optical channel 412 and an equalizer 420. The precoder 402 consists of an adder 404, modulus-M operator 406, and feedback filter $p_i - p_0 \delta_i$ 408, where $\delta_i$ is the kronecker delta. Its output $y_i$ 410 is written to an optical data-storage channel $h_i$ 412 representing the discrete-time equivalent combined response of precompensator, laser modulator, optical write and read systems (including MTF), analog read electronics, and ADC, as detailed in FIG. 2B. An adder 414 models the effect of laser, media, and electronic noise by adding a noise component $n_i$ 416 to the optical channel output. The channel 412, adder 414, and noise 416 comprise the discrete-time equivalent channel model 411, shown as a dotted rectangle encompassing them. The sampled read signal $r_i$ 418 enters a forward filter $f_i$ 422, which removes precursor ISI (interference in excess of the target in samples preceding the symbol) in each sample. The forward-filtered signal enters an adder 424 whose output $z_i$ 432 enters a slicer 426 that makes tentative decisions 428. These tentative decisions 428 are then fed back through a digital reverse filter $g_i$ 430 to predict postcursor ISI (interference in excess of the target in samples following the symbol) due to each estimated symbol, which the adder 424 then subtracts from the forward-filtered signal. The forward filter 422, adder 424, slicer 426, and reverse filter 430 comprise the DFE 420. The DFE output $z_i$ 432 is some linear combination, i.e., the ZF or PR target, of the precoded channel input sequence $y_i$ 410 plus an additive noise component. Finally a detector 434 produces an estimate $\hat{x}_i$ 436 of the original input data $x_i$ 400.

The sampled read signal 418 is given by:

$$r_i = h_i * y_i + n_i.$$

The equalized signal 432 is given by:

$$z_i = f_i * r_i - g_i * [z_{i-1}],$$

where [] represents the slicing operation that produces tentative decisions 428.

Given an optical channel response $h_i$ and an equalization target $p_i$, analytical methods for calculating the coefficients $f_i$ and $g_i$ of the forward and reverse filters, respectively, are readily available in the published literature such as *Digital Communications*, Proakis, Third Ed., pp. 621–622; and in *Digital Communications*, Lee, Edward A. and Messerschmitt, David G., Second Edition, Kluwer Academic Publishers, 1994, pp. 453–456, which are herein incorporated by reference for all purposes.

The performance of an optical data-storage system with a DFE is usually better than the performance of an LE because a DFE does not enhance noise. The slicer 426, by making decisions on the actual symbols, removes the noise before the signal is fed back through the reverse filter 430. However, the slicer decisions 428 are tentative, meaning that some decisions are in error. These errors are fed back, resulting in incorrect postcursor ISI being subtracted from the signal, which can cause further decision errors. This phenomenon is called error propagation; studies have shown that error propagation effects are usually insignificant compared to the benefits of reduced noise enhancement as shown in *Digital Communications*, Lee, Edward A. and Messerschmitt, David G., Second Edition, Kluwer Academic Publishers, 1994, Appendix 10-A. This is particularly true for data-storage systems, which of necessity must be very reliable, so that their operating point is very low in terms of errors to begin with, which means that slicer decisions 428 are already very reliable.

3. Fractionally Spaced Equalization

Figure 5:
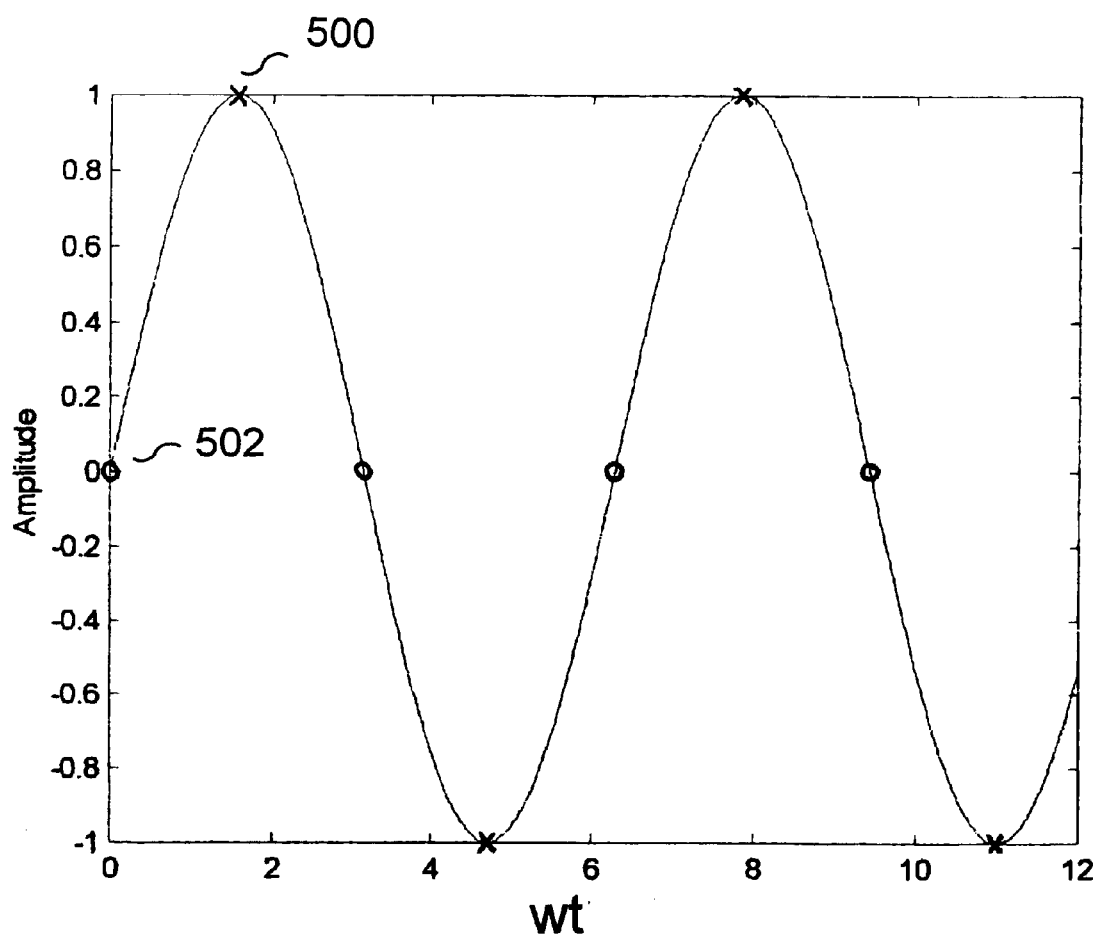
FIG. 5: Sine Wave Illustrating Principle of Oversampling

The previously mentioned embodiments for ZF and PR targets use equalizers, either a LE or a DFE, with tap spacings of one symbol, or baud. For such optical data-storage systems with baud-spaced equalizers (BSE) to achieve good performance, some assumptions have been made about the continuous-time portion of the system described in FIG. 2B. First, the ADC 264 must sample precisely in the center of each symbol. Consider, for example, a sinusoid $s(t) = \sin \omega t$ shown in FIG. 5. If the ADC samples at $\omega t = \pi/2, 3\pi/2, \ldots$, shown as x's 500 in the figure, then the original sinusoid can be reconstructed perfectly from the samples. However, if the ADC samples exactly $\pi/2$ out of phase, that is, at $\omega t = 0, \pi, 2\pi, \ldots$, shown as o's 502 in the figure, then all the samples are zero, so no signal can be reconstructed.

Second, the continuous-time (CT) optical channel response $h(t)$ of the optical write and read systems, including MTF, must be precisely known. Moreover, the analog read electronics includes an analog filter 258 that ideally should be matched to the CT optical channel response $h(t)$, i.e., an analog filter with an impulse response $h(-t)$, because a matched filter will provide better performance than an anti-aliasing filter. Third, the CT optical channel response $h(t)$ must be relatively stationary, because it is not easy to adapt an analog filter.

In practical systems, especially in mass-produced, inexpensive, commodity optical drives, none of these assumptions is valid. First, there will be sampling-phase offsets in the ADC because of manufacturing variations in the phase-locked loop that recovers the symbol clock. Secondly, digital electronics operating from a symbol clock on samples after the ADC can not measure a CT optical channel response, and analog electronics for such measurements would be prohibitively complex. Finally, as a disc spins within a drive, disc warpage and eccentricity will cause cyclical variations in the optical channel response.

A solution for dealing with the first two problems is to sample more than once per symbol and to replace the complicated analog matched filter with a simple analog anti-aliasing filter and a digital fractionally spaced equalizer (FSE) to provide the channel-matching functionality. In one embodiment, the optical data-storage system uses a fractionally spaced linear equalizer with a ZF or PR target; in another embodiment, the system uses a fractionally spaced decision-feedback equalizer with a ZF or PR target.

Figure 6A:
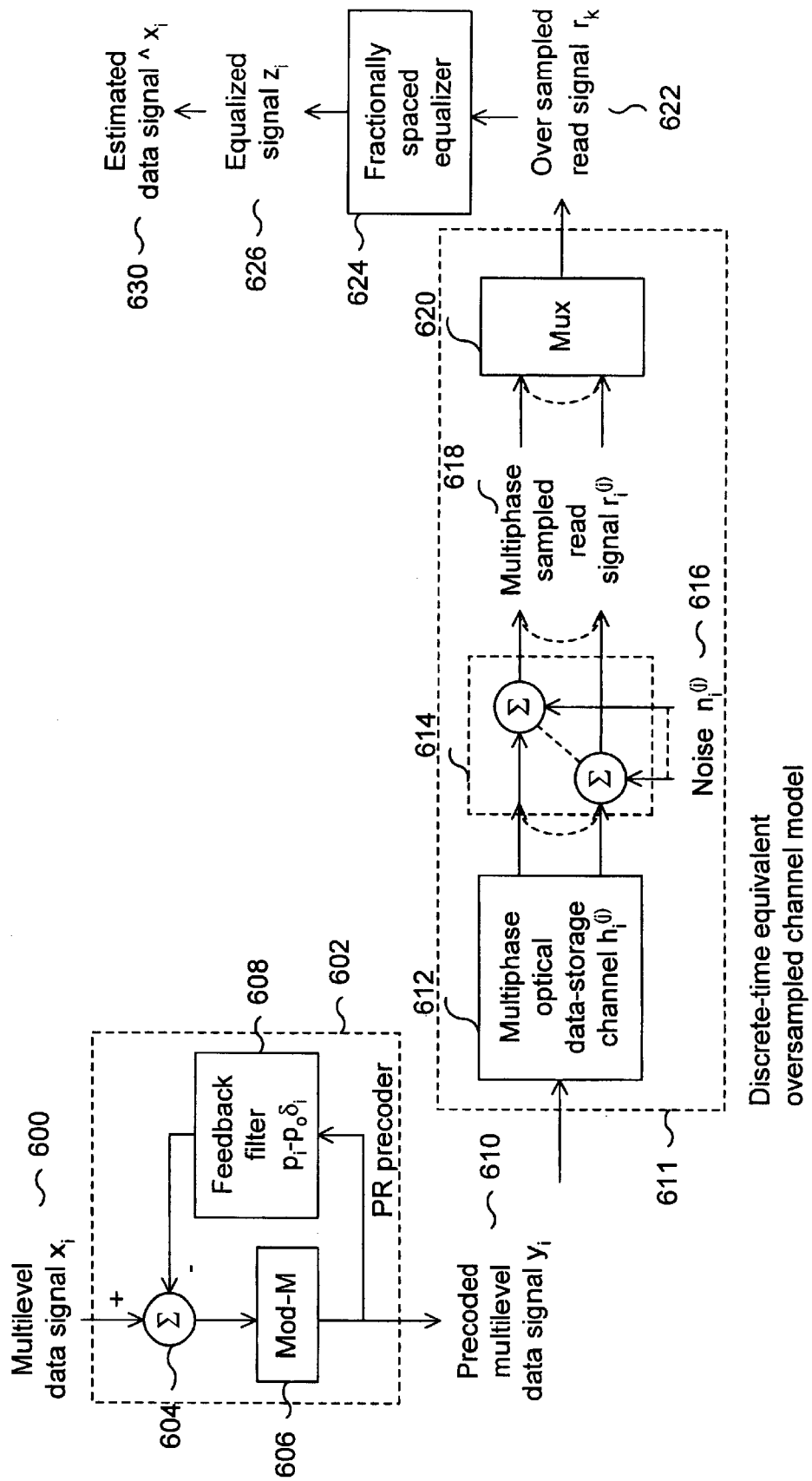
FIG. 6A: Multilevel Optical Data-Storage System Using Fractionally Spaced Equalization

FIG. 6A is a block diagram illustrating such a system. A multilevel data symbol sequence $x_i$ 600 enters an optional PR precoder 602 (no precoder for ZF case) that subtracts future ISI of the PR target $p_i$ introduced by an optical channel 612 and an equalizer 624. The precoder 602 consists of an adder 604, modulus-M operator 606, and feedback filter $p_i - p_0 \delta_i$ 608, where $\delta_i$ is the kronecker delta. Its output $y_i$ 610 is written to an optical data-storage channel $h_i^{(j)}$ 612 representing the discrete-time equivalent combined response of precompensator, laser modulator, optical write and read systems (including MTF), analog read electronics, and ADC. The optical channel $h_i^{(j)}$, $j = 1 \ldots P$, 612 has P sampling phases for each symbol. In one embodiment, P=2 samples per symbol, with $h_i^{(1)}$ corresponding to sampling in the center of each mark, and $h_i^{(2)}$ corresponding to sampling in between pairs of marks. A bank of adders 614 models the effect of laser, media, and electronic noise by adding noise components $n_i^{(j)}$, $=1 \ldots P$, 616 to corresponding phases of the optical channel output. The multiple phases of the sampled read signal $r_i^{(j)}$, $j = 1 \ldots P$, 618 enter a multiplexer 620 that combines them into a single oversampled read signal stream $r_k$ 622. The channel 612, bank of adders 614, noise vector 616, read signal 618 and multiplexer 620 comprise the discrete-time equivalent multi-phase channel model 611, shown as a dotted rectangle encompassing them. It models the oversampled physical optical channel as a multiplexed, linear, time-invariant system with additive noise. The oversampled read signal $r_k$ 622 then enters an FSE 624, which removes ISI in excess of the desired ZF or PR target, in the process downsampling back to one sample per symbol. The FSE output $z_i$ 626 is some linear combination, i.e., the ZF or PR target, of the precoded channel input sequence $y_i$ 610 plus an additive noise component. Finally a detector 628 produces an estimate $\hat{x}_i$ 630 of the original input data $x_i$ 600.

Figure 6B:
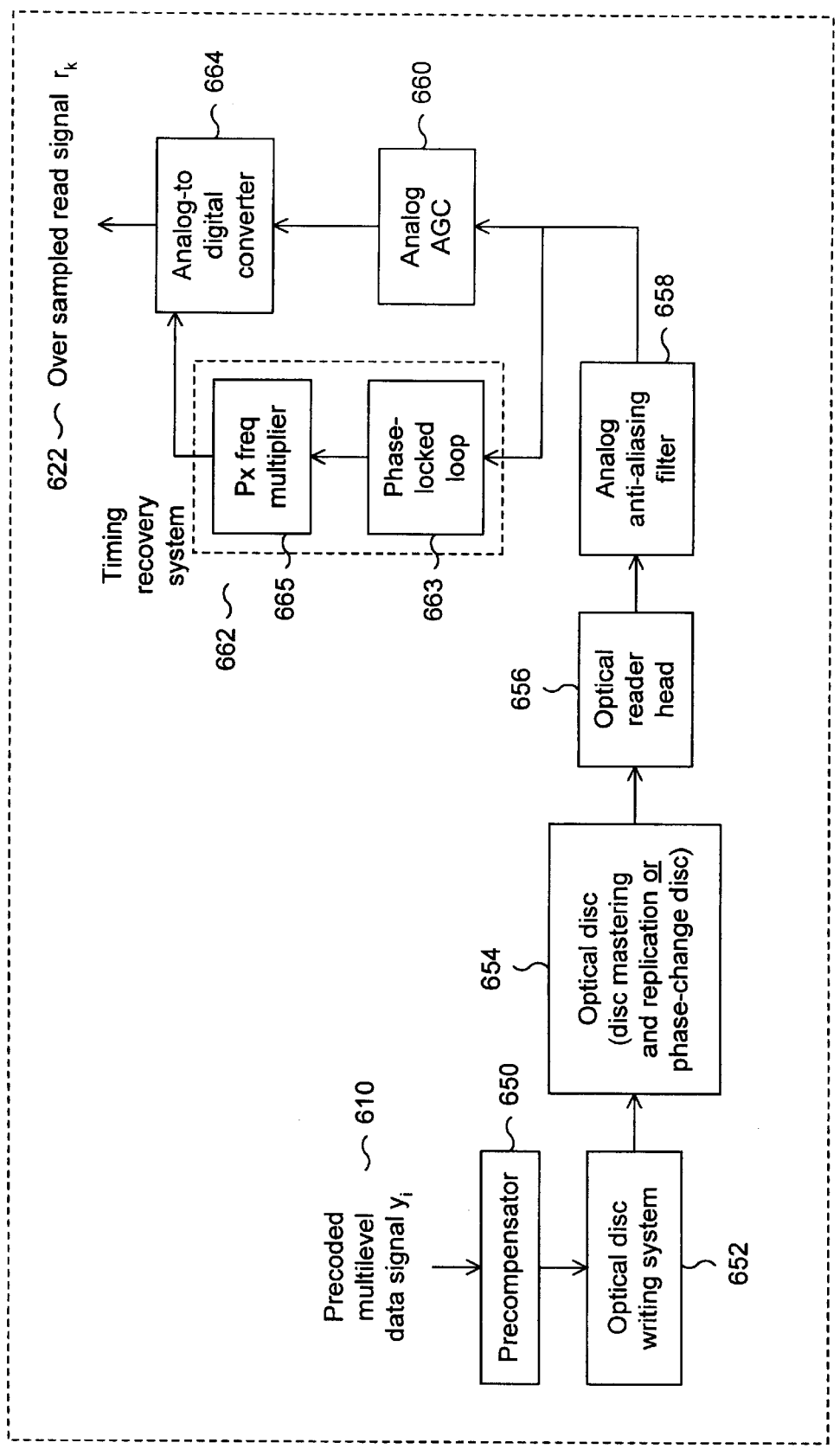
FIG. 6B: Oversampled Optical Data-Storage Channel

FIG. 6B shows the discrete-time equivalent oversampled optical data-storage channel model 611 of FIG. 6A in greater detail. Multilevel data symbols $y_i$ 610 enter a precompensator 650 that contains a write strategy for translating the discrete-time multilevel symbol sequence into a continuous-time laser modulation signal. The laser modulation signal is sent to an optical disc writing system 652, which writes marks onto an optical disc 654. In one embodiment, this optical disc undergoes a disc mastering and replication process as typically used in ROM data-storage systems. In another embodiment, this optical disc is made of phase-change or dye material as typically found in WORM (write once, read many) and RW (rewritable) data-storage systems. An optical reader head 656 reads the optical disc 654 (possibly a different disc physically if it is a ROM data-storage system, but still containing the same data), producing an analog read signal which enters an analog anti-aliasing filter 658, which is a low-pass filter for removing high-frequency signals to prevent aliasing and to reduce noise. The filtered signal then enters an optional analog automatic gain controller (AGC) 660 and a timing-recovery system 662. The timing-recovery system 662 contains a PLL 663 to recover the symbol clock as well as a frequency multiplier 665 to produce a clock frequency P times higher than the symbol clock frequency. It is this clock, rather than the symbol clock, which controls an ADC 664 that samples the desnaked read signal. The ADC output is the oversampled read signal $r_k$ 622 of FIG. 6A.

The multiple phases of the sampled read signal 618 are given by:

$$r_i^{(j)} = h_i^{(j)} * y_i + n_i^{(j)}, j=1 \ldots P.$$

The oversampled read signal 622 is given by:

$$r_{P \cdot i+j} = r_i^{(j)}.$$

Figure 6C:
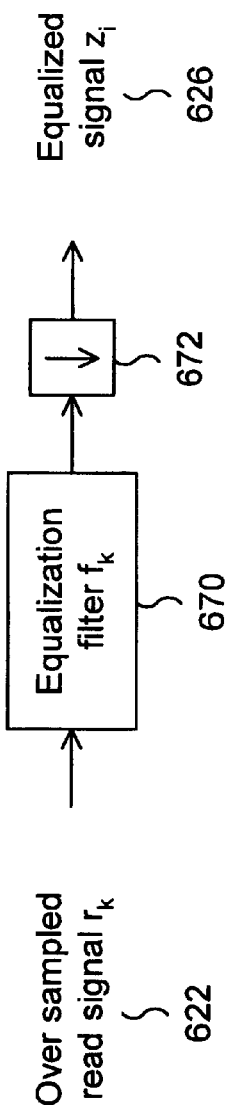
FIG. 6C: Fractionally Spaced Linear Equalizer

FIG. 6C shows a block diagram of the FSE 624 of FIG. 6A when a linear equalizer is used. The oversampled read signal $r_k$ 622 enters an equalization filter $f_k$ 670; the filtered output enters a P-times downsampler 672 that drops P−1 of every P samples. The output of the downsampler 672 is the downsampled equalized signal $z_i$ 626.

The downsampled equalized signal 626 for a fractionally spaced linear equalizer is given by:

$$z_i = f_k * r_k, \text{ evaluated at } k = P \cdot i + 1.$$

Figure 6D:
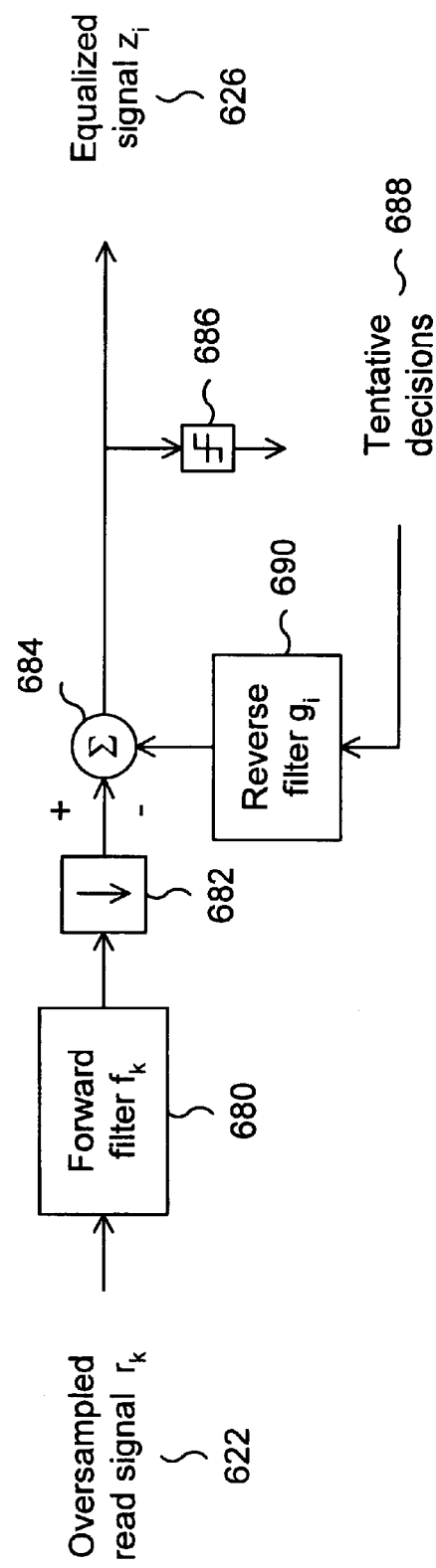
FIG. 6D: Fractionally Spaced Decision-Feedback Equalizer

FIG. 6D shows a block diagram of the FSE 624 of FIG. 6A when a decision-feedback equalizer is used. The oversampled read signal $r_k$ 622 enters a forward filter $f_k$ 680, which removes precursor ISI in each sample. The forward-filtered signal enters a P-times downsampler 682 that drops P−1 of every P samples. The downsampled forward-filtered signal enters an adder 684, whose output $z_i$ 626 enters a slicer 686 that makes tentative decisions 688. These tentative decisions 688 are then fed back through a digital reverse filter $g_i$ 690 to predict postcursor ISI (interference in excess of the target in samples following the symbol) due to each estimated symbol, which the adder 684 then subtracts from the downsampled forward-filtered signal. The adder output $z_i$ 626 is the downsampled equalized signal $z_i$ 626. Note that the forward filter $f_k$ 680 operates at the P-times oversampled clock rate, while the reverse filter $g_i$ 690 operates at the normal symbol clock rate.

The downsampled equalized signal 626 for a fractionally spaced decision-feedback equalizer is given by:

$$z_i = f_k * r_k - g_i * [Z_{i-1}], \text{ evaluated at } k = P \cdot i + 1.$$

Given a P-phase optical channel response $h_i^{(j)}$, j=1...P, and an equalization target $p_i$, analytical methods for calculating the coefficients $f_k$ of the fractionally spaced linear equalizer 670, and the coefficients $f_k$ and $g_i$ of the forward 680 and reverse 690 filters, respectively, of the fractionally spaced decision-feedback equalizer, are readily available in the pulished literature such as *Digital Communications*, Lee, Edward A. and David G., Second Edition, Kluwer Academic Publishers, 1994,. pp. 482–486.

Figure 7:
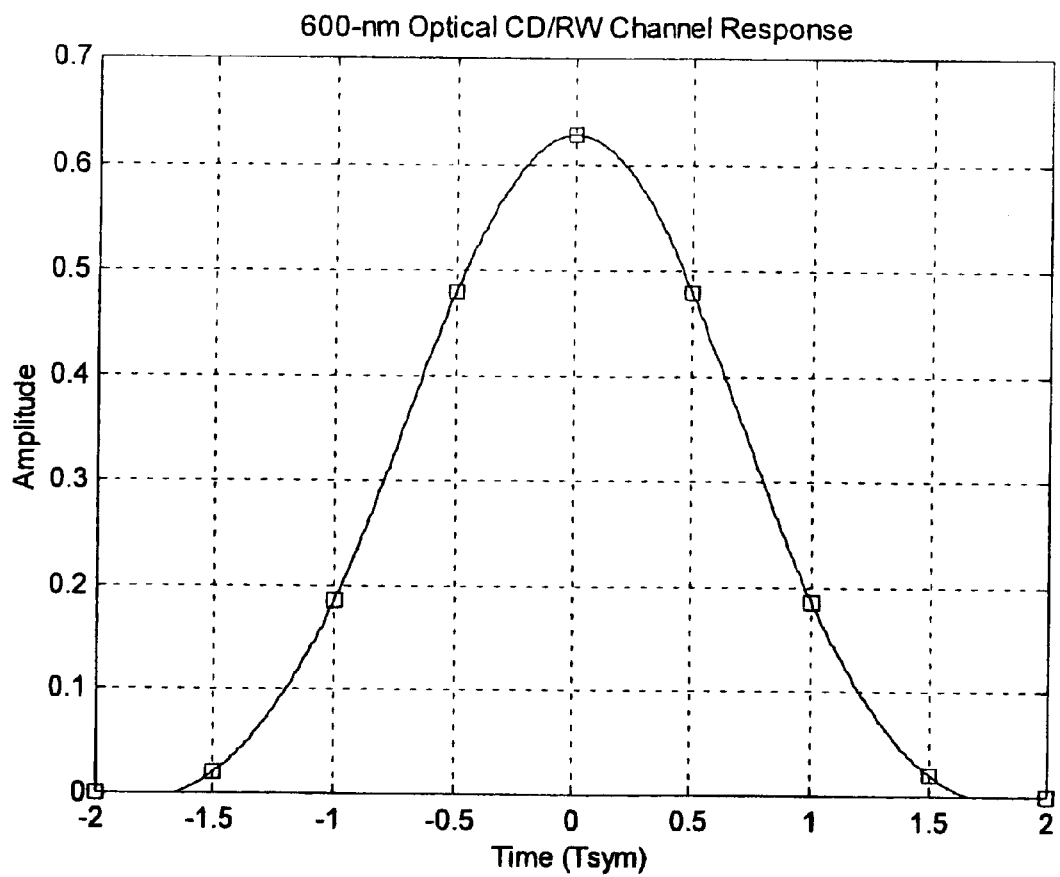
FIG. 7: Continuous-Time Optical Data-Storage Channel Response

4. Simulation Results Simulation results, based on a measured optical CD-RW channel, illustrate the advantages of the above-mentioned embodiments. FIG. 7 is a plot of the continuous-time channel response h(t) measured from an optical CD-RW data-storage system using a phase-change media disc with 600-nm long marks. Table 1 is a chart of the discrete-time channel taps $h_i$ at various sampling offsets. The simulation uses white Gaussian noise samples added after the channel.

TABLE 1

| Sampling Offset (% $T_s$) | $h_{-1.5}$ | $h_{-1}$ | $h_{-0.5}$ | $h_0$ | $h_{0.5}$ | $h_1$ | $h_{1.5}$ |
|---|---|---|---|---|---|---|---|
| 0 | 0.0200 | 0.1860 | 0.4800 | 0.6280 | 0.4800 | 0.1860 | 0.0200 |
| 1 | 0.0184 | 0.1809 | 0.4746 | 0.6279 | 0.4853 | 0.1912 | 0.0217 |
| 2 | 0.0168 | 0.1759 | 0.4692 | 0.6277 | 0.4905 | 0.1964 | 0.0235 |
| 3 | 0.0152 | 0.1709 | 0.4637 | 0.6274 | 0.4957 | 0.2018 | 0.0253 |
| 4 | 0.0138 | 0.1661 | 0.4581 | 0.6269 | 0.5008 | 0.2072 | 0.0272 |
| 5 | 0.0123 | 0.1613 | 0.4524 | 0.6263 | 0.5058 | 0.2127 | 0.0291 |
| 6 | 0.0110 | 0.1566 | 0.4467 | 0.6255 | 0.5107 | 0.2182 | 0.0311 |

TABLE 1-continued

| Sampling Offset (% $T_s$) | $h_{-1.5}$ | $h_{-1}$ | $h_{0.5}$ | $h_0$ | $h_{0.5}$ | $h_1$ | $h_{1.5}$ |
|---|---|---|---|---|---|---|---|
| 7 | 0.0097 | 0.1519 | 0.4410 | 0.6246 | 0.5156 | 0.2238 | 0.0332 |
| 8 | 0.0084 | 0.1474 | 0.4352 | 0.6236 | 0.5203 | 0.2295 | 0.0353 |
| 9 | 0.0072 | 0.1429 | 0.4293 | 0.6224 | 0.5250 | 0.2352 | 0.0375 |
| 10 | 0.0061 | 0.1385 | 0.4235 | 0.6212 | 0.5296 | 0.2410 | 0.0398 |
| 11 | 0.0050 | 0.1342 | 0.4175 | 0.6197 | 0.5341 | 0.2468 | 0.0421 |
| 12 | 0.0039 | 0.1299 | 0.4115 | 0.6182 | 0.5385 | 0.2526 | 0.0445 |
| 13 | 0.0030 | 0.1257 | 0.4055 | 0.6166 | 0.5429 | 0.2585 | 0.0469 |
| 14 | 0.0020 | 0.1216 | 0.3995 | 0.6148 | 0.5471 | 0.2645 | 0.0494 |
| 15 | 0.0012 | 0.1176 | 0.3934 | 0.6129 | 0.5512 | 0.2705 | 0.0520 |

Figure 8:
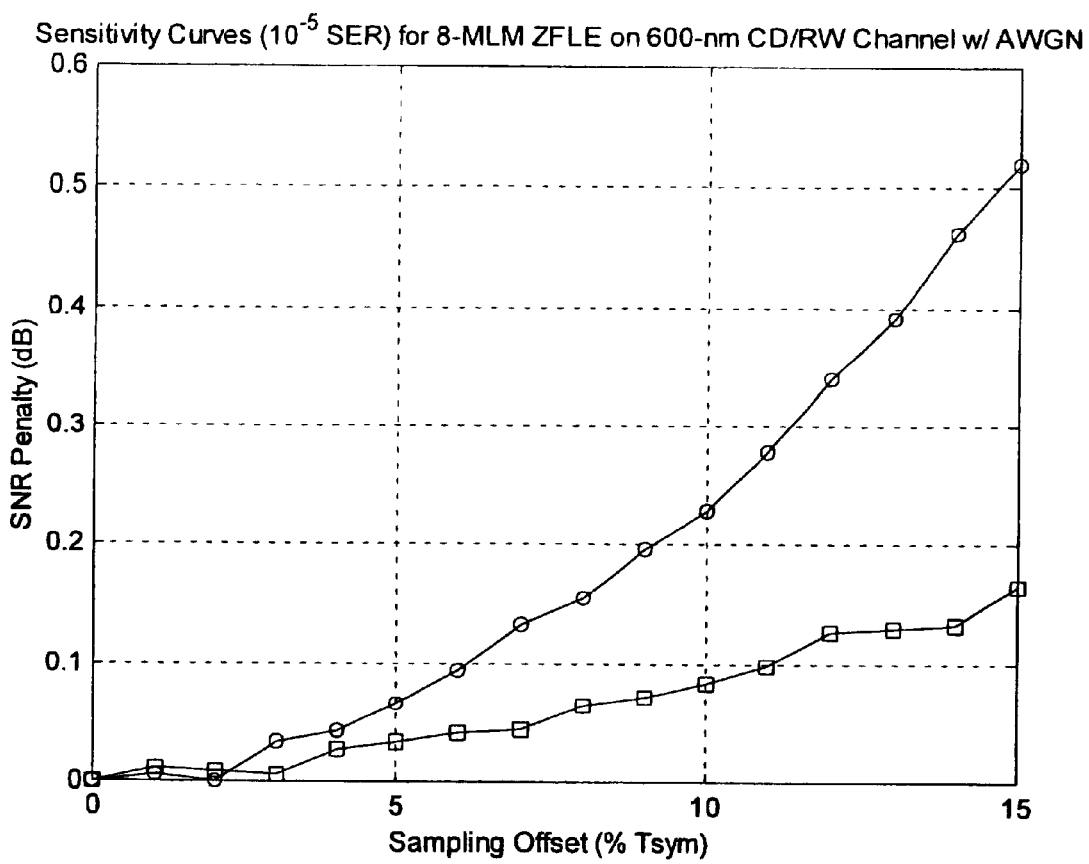
FIG. 8: SNR Penalties of Baud-Spaced and Fractionally Spaced Zero-Forcing Linear Equalization versus Sampling Offset

FIG. 8 compares the performances of a ZF-LE with baud spacing and fractional spacing. It shows the signal-to-noise ratio (SNR) penalty incurred due to a sampling offset in order to achieve $10^{-5}$ probability of symbol error (sometimes denoted symbol-error rate, or SER), where the performance at zero sampling offset serves as the 0-dB baseline. The sensitivity (to sampling offset) curve clearly shows that baud-spaced equalization (BSE) suffers much higher penalties than fractionally spaced equalization (FSE). At a sampling offset of 15% of a symbol period, BSE has an SNR penalty of 0.52 dB, whereas FSE has an SNR penalty of only 0.17 dB. Thus FSE is more robust to sampling offsets than BSE.

Figure 9:
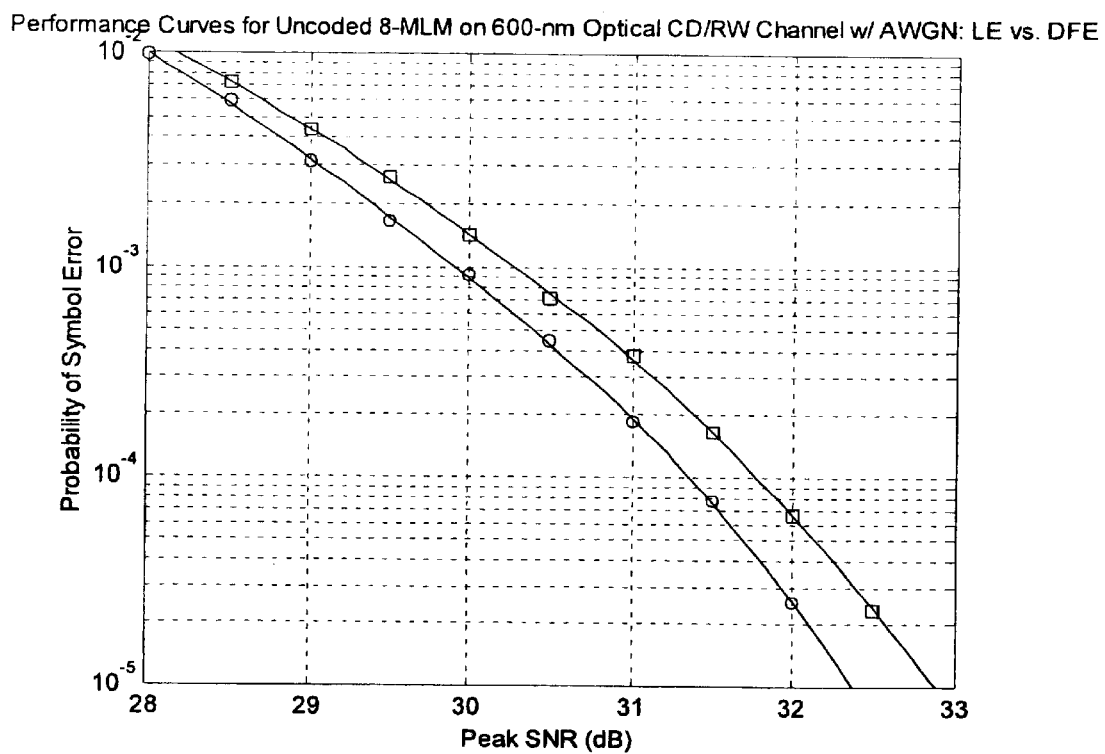
FIG. 9: Performance of Zero-Forcing Linear versus Decision-Feedback Equalization

FIG. 9 compares the performances of linear and decision-feedback equalization using zero-forcing fractionally spaced equalizers. It shows waterfall curves of the probability of symbol error versus peak SNR, defined as the ratio of the peak signal to noise variance at the point of sampling. At $10^{-5}$ probability of symbol error, DFE has a gain of 0.5 dB as compared with LE. Even at $10^{-2}$ probability of symbol error, DFE is still better than LE by about 0.2 dB; the smaller gain is due to increased number of errors in the decisions being fed back. This simulation uses channel taps from Table 1 corresponding to zero sampling offset. Tables 2 and 3 show the corresponding ZF-LE and ZF-DFE taps, respectively.

TABLE 2

| $f_k$ |
|---|
| −0.0135 |
| 0.1257 |
| −0.2918 |
| 0.1186 |
| 0.4016 |
| −0.3116 |
| −0.6286 |
| 0.4550 |
| 1.2890 |
| 0.4550 |
| −0.6286 |
| −0.3116 |
| 0.4017 |
| 0.1185 |
| −0.2918 |
| 0.1258 |
| −0.0135 |

TABLE 3

| $f_k$ | $g_i$ |
|---|---|
| 1.7637 | 0.3281 |
| −0.5786 | |
| 0.1897 | |
| −0.0622 | |
| 0.0202 | |
| −0.0064 | |
| 0.0016 | |

Figure 10:
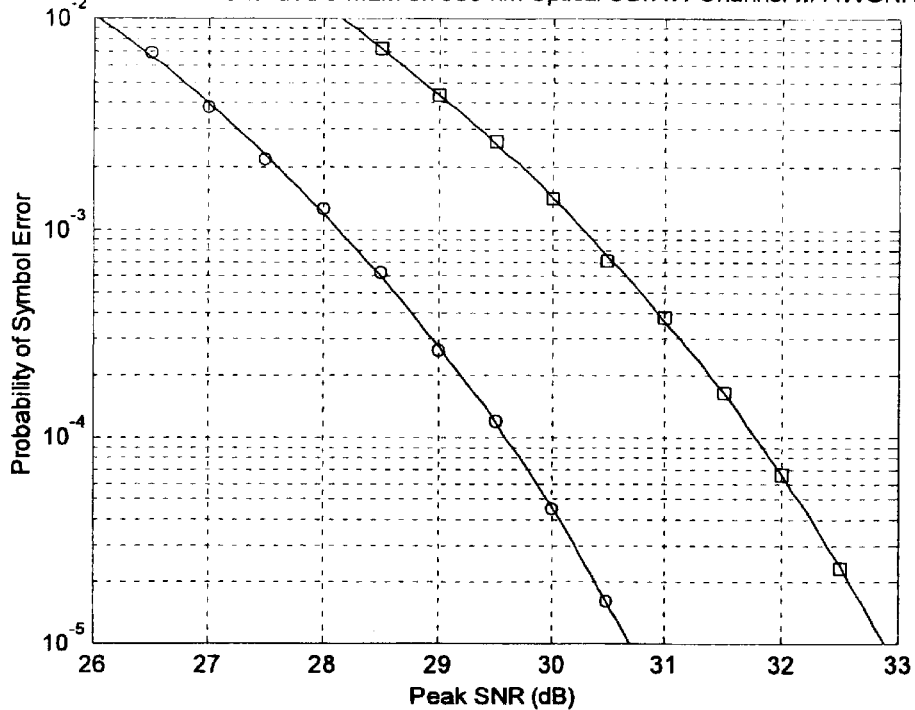
FIG. 10: Performance of Zero-Forcing versus Partial-Response Linear Equalization

FIG. 10 compares the performance of fractionally spaced linear equalizers with zero-forcing (ZF) and partial-response class 1 (PR1) targets. It shows waterfall curves of probability of symbol error versus peak SNR. PR1 equalization has a gain of over 2 dB compared with ZF equalization, thus demonstrating the advantage of partial-response equalization over zero-forcing equalization. This simulation also uses channel taps from Table 1 corresponding to zero sampling offset. Table 4 shows the corresponding PR1-LE taps.

TABLE 4

| $f_k$ |
|---|
| 0.0084 |
| −0.0780 |
| 0.1783 |
| −0.0508 |
| −0.2836 |
| 0.0516 |
| 0.6793 |
| 0.9897 |
| 0.6792 |
| 0.0516 |
| −0.2836 |
| −0.0508 |
| 0.1783 |
| −0.0779 |
| 0.0083 |

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of compensating for intersymbol interference in an optical data storage channel comprising:

measuring an intersymbol linear modulation transfer function for the optical data storage channel;
writing data to the optical data storage channel;
dividing a partial-response target frequency response for the optical data storage channel by said intersymbol linear modulation transfer function;
obtaining a linear equalization filter response from said step of dividing;
reading a read signal from the optical data storage channel;
convolving said read signal with said linear equalization filter response to produce an equalized read signal containing a controlled partial-response target intersymbol interference.

2. A method of compensating for intersymbol interference in an optical data storage channel as recited in claim 1 wherein prior to writing data, the method includes precompensating data for nonlinear intersymbol interference.

3. A method of compensating for intersymbol interference in an optical data storage channel as recited in claim 2 where said precompensating includes precompensating for a portion of linear intersymbol interference.

4. A method of compensating for intersymbol interference in an optical data storage channel as recited in claim 1 where said optical data storage channel includes a phase change optical storage disc.

5. A method of compensating for intersymbol interference in an optical data storage channel as recited in claim 1 where said optical data storage channel includes a dye based optical storage disc.

6. A method of compensating for intersymbol interference in an optical data storage channel as recited in claim 1 where said optical data storage channel comprises an optical master for writing and a replica produced from said optical master for reading.

7. A method of compensating for intersymbol interference in an optical data storage channel as recited in claim 1 wherein said measuring includes:
writing a known pattern to the optical data storage channel;
reading said known pattern from said optical data storage channel to obtain a recovered pattern; and
comparing said known pattern and said recovered pattern.

8. A method of compensating for intersymbol interference in an optical data storage channel as recited in claim 1 where said data is formatted as a multi-level signal.

9. A method of compensating for intersymbol interference in an optical data storage channel as recited in claim 1 where said data is formatted as a binary signal.

10. A method of compensating for intersymbol interference in an optical data storage channel as recited in claim 1 where said step of convolving uses a baud spaced equalizer.

11. A method of compensating for intersymbol interference in an optical data storage channel as recited in claim 1 where said step of convolving uses a fractionally spaced equalizer.

12. A method of compensating for intersymbol interference in an optical data storage channel as recited in claim 1 wherein prior to writing data, the method includes preceding data.

13. A method of compensating for intersymbol interference in an optical data storage channel comprising:

reading a read signal from the optical data storage channel; and
equalizing said read signal to achieve a desired target response, said equalizing including steps of:
forward filtering said read signal to remove precursor intersymbol interference, said forward filtering producing a forward filtering output;
slicing said forward filtering output to produce tentative decisions;
reverse filtering said tentative decisions to produce predicted postcursor intersymbol interference; and
subtracting said predicted postcursor intersymbol interference from said forward filtering output thereby producing an equalized read signal.

14. A method of compensating for intersymbol interference in an optical data storage channel as recited in claim 13 where said data is formatted as a multi-level signal.

15. A method of compensating for intersymbol interference in an optical data storage channel as recited in claim 13 where said data is formatted as a binary signal.

16. A method of compensating for intersymbol interference in an optical data storage channel as recited in claim 13 where said equalizing uses a baud spaced equalizer.

17. A method of compensating for intersymbol interference in an optical data storage channel as recited in claim 13 where said equalizing uses a fractionally spaced equalizer.

18. A method of compensating for intersymbol interference in an optical data storage channel as recited in claim 13 where said desired target response is a partial-response target frequency response.

19. A method of compensating for intersymbol interference in an optical data storage channel as recited in claim 13 where said desired target response is a zero-forcing target frequency response.

20. A method of compensating for intersymbol interference in an optical data storage channel as recited in claim 13 where said optical data storage channel includes a phase change optical disc and said reading obtains said read signal from said phase change optical disc.

21. A method of compensating for intersymbol interference in an optical data storage channel as recited in claim 13 where said optical data storage channel includes a dye based optical disc and said step of reading obtains said read signal from said dye based optical disc.

22. A method of compensating for intersymbol interference in an optical data storage channel as recited in claim 13 where said optical data storage channel includes a ROM optical disc and said step of reading obtains said read signal from said ROM optical disc.

23. A method of compensating for intersymbol interference in an optical data storage channel comprising:
measuring an intersymbol modulation transfer fiction for the optical data storage channel;
determining a desired target response from said modulation transfer fiction;
writing data to the optical data storage channel;
reading a read signal from the optical data storage channel; and
equalizing said read signal to achieve said desired target response, said equalizing including:
forward filtering said read signal for removing precursor intersymbol interference, said forward filtering producing forward filtering output;

slicing said forward filtering output to produce tentative decisions;

reverse filtering said tentative decisions to produce predicted postcursor intersymbol interference; and subtracting said predicted postcursor intersymbol interference from said forward filtering output thereby producing an equalized read signal.

24. A method of compensating for intersymbol interference in an optical data storage channel as recited in claim 23 where said desired target response is a partial-response target frequency response.

25. A method of compensating for intersymbol interference in an optical data storage channel as recited in claim 24 wherein prior to writing data, the method includes preceding data.

26. A method of compensating for intersymbol interference in an optical data storage channel as recited in claim 24 where said precompensating includes precompensating for a portion of linear intersymbol interference.

27. A method of compensating for intersymbol interference in an optical data storage channel as recited in claim 23 where said desired target response is a zero-forcing response target frequency response.

28. A method of compensating for intersymbol interference in an optical data storage channel as recited in claim 23 wherein prior to writing data, the method includes precompensating data for nonlinear intersymbol interference.

* * * * *